Dec. 13, 1955     O. MEYER     2,727,163
AXIAL AIR-GAP ELECTRIC MOTOR
Filed April 25, 1952
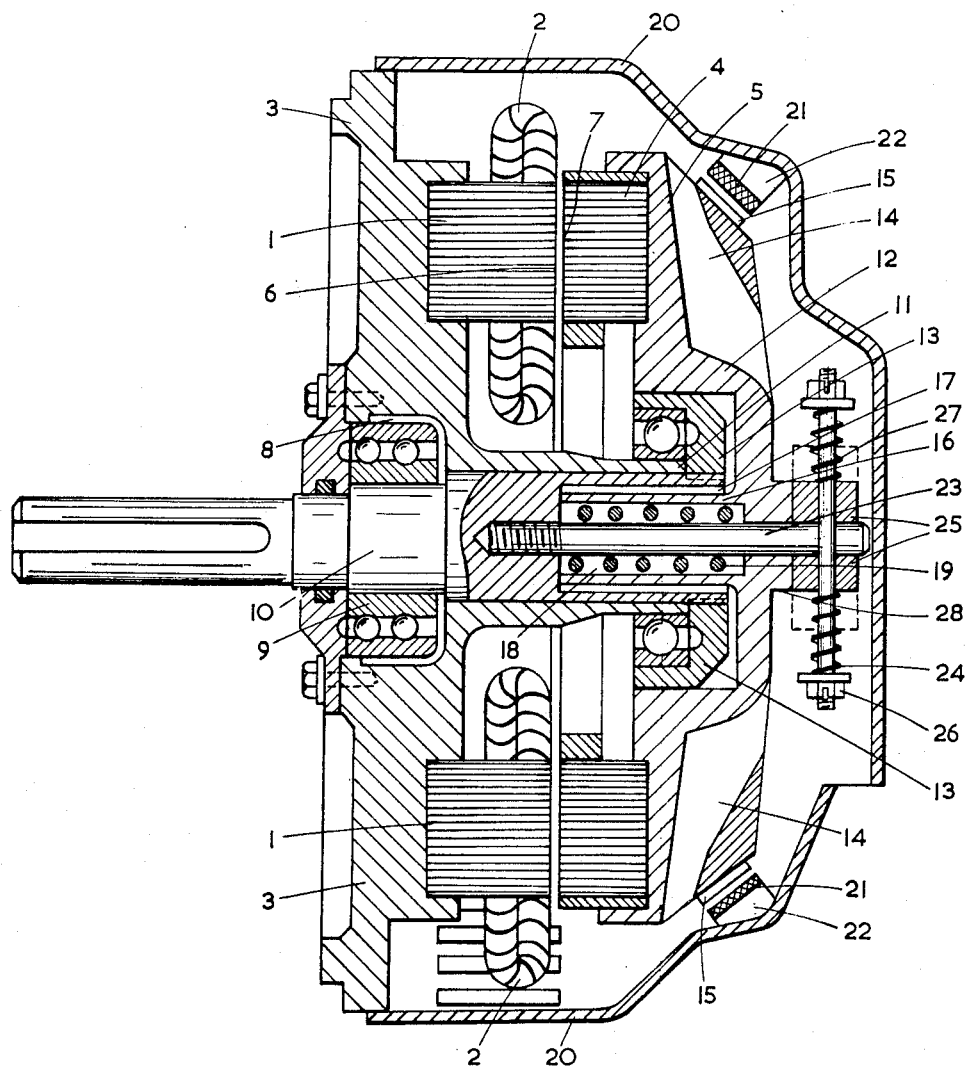

2,727,163

AXIAL AIR-GAP ELECTRIC MOTOR

Otto Meyer, Duisburg, Germany, assignor to Demag-Zug G. m. b. H., Wetter (Ruhr), Germany Application April 25, 1952, Serial No. 284,214

Claims priority, application Germany May 2, 1951

6 Claims. (Cl. 310—77)

The invention relates to an electric motor, in which the stator and the rotor are so designed and mounted that the pole-surfaces extend perpendicularly to the axis of the motor and in which the rotor is displaceable beyond the extent required for adjusting the air-gap, and that this displaceability is utilized for operating a brake, a coupling, or any other device. These electric machines, which are known as disc motors, include also those, in which the pole-surfaces are slightly inclined relatively to the axis of the motor, and the pole-surfaces of which thus form a flat cone.

The advantage of the motors referred to consists in their compact construction in the axial direction. Such motors are particularly adapted for use as additional motors for machine tools, in which it is desirable that the motor should project laterally as little as possible.

The magnetic axial forces operating in a motor of this type between the stator and the rotor, are absorbed by an axial bearing, which may serve at the same time to adjust the width of the air-gap between the pole-surfaces.

This means, which is known per se in motors having a cylindrical or conical rotor, is particularly advantageous in a motor of the type above referred to. Due to the relatively large diameter of the disc-motor it is possible, for example when a brake is operated by means of the displaceable rotor, to provide this brake with a large central braking radius so that thus a relatively high braking moment is obtained. In this manner it is possible to use conical brakes having a large cone-angle instead of the flat conical brakes otherwise used, which require long paths of displacement, even when a braking moment is required which amounts to several times the nominal moment, or it is possible to make do with an ordinary disc-brake requiring only a short releasing path, when motors are used which only require a normal stopping brake, in which the braking moment equals the nominal moment. In addition, due to the pole-surfaces of stator and rotor being disposed oppositely to each other in the direction of displacement, the axial force of such a motor is considerably greater than in a motor of known construction, so that the braking or coupling moment is further increased.

In a motor with displaceable armature it is an object to keep the air-gap between the stator and rotor as narrow as possible, as when the motor is inoperative, axial magnetic pull for overcoming the forces of the brake-spring is greater, the smaller the selected air-gap. In a motor with displaceable armature and with a conical rotor, the width of the air-gap is changed in the displacement of the rotor by an amount considerably less than the distance of displacement of the rotor. When the motor is displaced due to wear of the brake lining, the width of the air-gap and thus the axial pull, are only slightly affected. In a disc motor, however, in which the air-gap extends in a direction perpendicular to the direction of displacement of the rotor, this is not so, for in this case an axial displacement of the rotor by a determined amount results in the width of the air-gap being changed by the same amount. When due to wear, the air-gap is widened, the axial tractive magnetic forces will decrease considerably and will eventually no longer be able to overcome the force of the brake-spring. It is, therefore, necessary in a disc motor with displaceable armature, so to construct it that the friction surfaces can readily be adjusted or alternatively, the friction lining can be replaced at any time without difficulty.

It is among the objects of the invention to provide a disc motor with displaceable armature in which the motor is so constructed that the friction lining can be readily replaced.

It is further among the objects of the invention to provide means whereby the rotor is automatically braked when the motor is switched-off.

It is a still further object of the invention to provide means whereby the brake can be readily released to enable the rotor to be rotationally adjusted, as for example when adjusting the tool when the motor is used for driving machine tools.

According to the invention, the rotating friction ring of the disc motor is mounted on that side of the motor which is remote from the machine to be driven, thus the stationary friction ring of the brake is readily accessible, advantageously on the inner surface of a protective housing, which is connected to the motor so as to be readily detachable.

As the motor according to the invention is intended in the first place for driving machine tools, which it must be possible to turn completely even when stationary, for example for adjusting the inserted work-piece, there is provided a device, by means of which it is possible to release the brake after operation of the motor. For this purpose, centrifugal weights are provided on the rotating part of the motor, which are opposed by springs the force of which is so great that the centrifugal weights are caused by the centrifugal force to leave their position of rest only when the motor has reached its full rotational speed. In the position of rest, the weights act as stops to prevent the axial displacement of the rotor and thus to prevent the brake from engaging. When a motor of this design is switched-on for a short period only, that is to say is supplied with current for a period which is so short that the motor cannot reach its full rotational speed, then the brake cannot operate. However, when the motor is supplied with current for a proloned period of time, that is to say, when the motor reaches its full rotational speed, the centrifugal force will overcome the force of the springs and the centrifugal weights leave the locking position. When the motor is subsequently switched-off, the brake can operate, because the centrifugal weights are for the time being still subject to the action of the centrifugal force, and can thus only reach their locking position when the motor has been switched-on again.

To free the rotor, that is to say to release the brake when, for example, it is desired to adjust the rotational position of the rotor for adjusting the tool, the motor is switched on for a short period only which is insufficient to cause centrifugal movement of the weights but enables the rotor to move axially towards the stator thus removing, a shoulder formed thereon to enable the weights bearing on the shoulder to fall into the position of rest with the brake released.

One construction of the invention is illustrated by way of example in the accompanying drawing showing a longitudinal section of the motor.

The bundle of laminations 1 of the stator with the exciter winding 2 provided therein is secured to the part 3 of the motor housing, whereas the bundle of laminations 4 of the rotor is provided on the rotatable part 5.

The pole-surfaces 6 and 7 of stator and rotor respectively extend in planes at right angles to the plane of the axis of the motor; they may however also be slightly inclined relatively thereto. The part 3 of the motor housing is provided with a boring 8, in which is inserted a ball-bearing 9 for mounting the motor shaft 10. On a bushing 11 formed integral with the part 3 of the housing, there is provided an additional ball-bearing 12 on which is mounted the forward part of the shaft 10 by means of an intermediate member 13 which is secured on the shaft 10. The part 5, supporting the bundle of laminations of the rotor, is designed as a disc fan and is provided with channels 14 for the purpose. On this part is also provided a friction ring 15. The part 5 engages by means of a pin 16 and multi-groove splines 17 in the shaft 10 and can be displaced axially on the shaft 10 and on the intermediate member 13, but is not rotatable relatively thereto. In a boring 18 provided in the pin 16 there is disposed a coil spring 19, which exerts a force against the part 5, and also against the motor shaft 10, thus causing the friction ring 15 when the motor is switched off to bear against the lining 21 of the friction ring 22. The ring 22 formed with the lining 21, is mounted at an appropriate position on the inner surface of a motor protective housing 20, which is itself mounted in such manner as to be readily disengaged from the part 3. In the event of wear, the part 21 or the part 15 may be readily replaced on simple removal of the housing 20. On the bolt 23 which extends through the brake-spring 19 and the rotatable part 5, and which is connected to the motor shaft 10, there are radially mounted a number of threaded bolts 24, on which annular sliding weights 25 are slidably mounted. The free ends of the bolts 24 are provided with threads for nuts 26, pressure coil springs 27 being provided between the nuts 26 and the sliding weights 25.

When current is passed through the stator winding which in addition to a torque also exerts an axial force due to the particular manner in which the pole-surfaces of stator and rotor are disposed, the rotor, while overcoming the restoring force of the spring 19, is drawn towards to the stator, from which it is separated by the air-gap, and is caused to rotate. When the rotor has reached its normal rotational speed, the sliding weights 25 are caused to slide on the threaded guide bolts 24 in opposition to the action of the springs 27, by centrifugal force, so as to come to lie in the position indicated in shaded lines, and moving out of range of the shoulder 28 provided on the part 5. When the motor is switched off, the axial force being thus eliminated, the spring 19 forces the rotor with the friction ring 15 against the lining 21 of the friction ring 22, so that the rotor is braked or, when stationary, held in position. This displacement of the rotor is at this time not obstructed by the sliding weights 25 which are still subject to the action of centrifugal force. When the centrifugal force decreases, the sliding weights 25 are shifted by the springs 27 in the direction of the axis of the motor, thus coming to bear on the annular shoulder 28 serving as a stop.

When the brake is to be released, the motor is switched on for a period which is so short that the rotor cannot reach normal rotational speed. This short switching-on is sufficient to draw the rotor towards the stator field, the shoulder 28 of the rotatable part 5 being thus drawn out of the range of sliding motion of the sliding weights 25. As the centrifugal force of the sliding weights 25 is still insufficient to overcome the force of the springs 27, the springs force the sliding weights 25 into the locking position illustrated in the drawing, and the brake is thus prevented from engaging when the motor is subsequently switched-off.

Due to the fact that the part 5 serves at the same time as the disc fan and has a large diameter, or where the difference in radius between the suction side of the blades and the top edge of the blades is great, effective cooling of the motor is ensured. For obtaining a small torque of the rotor, the part 5 is advantageously made of a light metal, the strip-formed laminated bundles of the rotor may then be cast while this part is produced in a die-casting process.

In order to obtain a greater resistance to wear, or a sufficient friction value a corrosion-resistant layer of steel of high mechanical resistance to abrasion may be cast-on to the friction surface of the friction ring 15.

I claim:

1. An electric motor for driving a machine, comprising a stator positioned adjacent the machine to be driven, pole surfaces for said stator extending at right angles to the axis of the motor, a rotor displaceable in the direction of the axis of the motor and positioned on that side of the stator remote from the machine to be driven, said rotor being displaced towards the pole surfaces of said stator upon energization of said motor, a spring mounted for urging said rotor away from the pole surfaces of said stator, a protective housing for said motor, and a brake lining mounted on said housing for frictional engagement with said rotor when desired whereby replacement of said brake lining can be easily accomplished by dismantling only the housing of said motor.

2. An electric motor for driving a machine, comprising a stator positioned adjacent the machine to be driven; pole surfaces for said stator extending at right angles to the axis of the motor; a rotor displaceable in the direction of the axis of the motor and positioned on that side of the stator remote from the machine to be driven, said rotor being displaced toward said stator pole surfaces upon energization of said motor, the pole surfaces of said rotor being mounted to lie parallel to the surfaces of said stator; a spring mounted for urging said rotor away from the pole surfaces of said stator; a protective housing for said motor; and a brake lining mounted on said housing for frictional engagement with said rotor when desired whereby replacement of said brake lining can be easily accomplished by dismantling only the housing of said motor.

3. An electric motor for driving a machine, comprising a stator positioned adjacent the machine to be driven, pole surfaces for said stator extending at right angles to the axis of the motor, a rotor displaceable in the direction of the axis of the motor and positioned on that side of the stator remote from the machine to be driven, a brake surface on said rotor adapted for frictional engagement with a brake surface provided on a stationary, readily accessible part of the motor, a rotor-shaft, a pin extending axially of said rotor and secured in said shaft, a coil spring surrounding said pin and pressing at one end against the rotor and at the other end against said shaft, and means movable under centrifugal forces and serving in the position of rest to obstruct and prevent the displacement of the axially movable rotor to effect frictional engagement between said friction surfaces.

4. An electric motor for driving a machine, comprising a stator positioned adjacent the machine to be driven, pole surfaces for said stator extending at right angles to the axis of the motor, a rotor displaceable in the direction of the axis of the motor and positioned on that side of the stator remote from the machine to be driven, a brake surface on said rotor adapted for frictional engagement with a brake surface provided on a stationary, readily accessible part of the motor, a rotor-shaft, a pin extending axially of said rotor and secured in said shaft, a coil spring surrounding said pin and pressing at one end against the rotor and at the other end against the shaft, weights mounted on radial members extending perpendicularly from said pin, stop members secured on the ends of said radial members, and springs mounted on said radial members to press said weights in the position of rest of said rotor in a direction to seat on said pin, whereby displacement of the axially movable rotor is permitted to effect frictional engagement between said friction surfaces.

5. An electric motor for driving a machine, comprising a stator positioned adjacent the machine to be driven, pole surfaces for said stator extending at right angles to the axis of the motor, a rotor displaceable in the direction of the axis of the motor and positioned on that side of the stator remote from the machine to be driven, a brake surface on said rotor adapted for frictional engagement with a brake surface provided on a stationary, readily accessible part of the motor, a rotor-shaft, a pin extending axially of said rotor and secured in said shaft, a coil spring surrounding said pin and pressing at one end against the rotor and at the other end against the shaft, weights mounted on radial members extending perpendicularly from said pin, springs mounted on said radial members between said weights and stops provided at the ends of said radial members to press said weights in the position of rest of said rotor in a direction to seat on said pin, and means in the form of a shoulder on said rotor which is operative to obstruct the return of the said weights into the position in which they are seated on said pin with the friction surfaces in engagement and which means is adapted to be withdrawn on the switching on of the motor for a short period to enable the weights to seat on said pin with the friction surfaces out of engagement.

6. An electric motor for driving a machine, comprising a stator positioned adjacent the machine to be driven, pole surfaces for said stator extending at right angles to the axis of the motor, a rotor displaceable in the direction of the axis of the motor and positioned on that side of the stator remote from the machine to be driven, a brake surface on said rotor adapted for frictional engagement with a brake surface provided on a stationary, readily accessible part of the motor, a rotor-shaft, a bushing enclosing that end of said shaft projecting on the rotor side, and a ball bearing carried by said bushing on which said rotor is mounted.

References Cited in the file of this patent

UNITED STATES PATENTS

| | | |
|---|---|---|
| 1,038,494 | Nelson | Sept. 10, 1912 |
| 1,763,104 | Shurtleff | June 10, 1930 |
| 1,771,281 | Wilsing | July 22, 1930 |
| 2,506,028 | Le Tourneau | May 2, 1950 |
| 2,532,605 | Castleberry | Dec. 5, 1950 |
| 2,553,687 | Stueland | May 22, 1951 |

FOREIGN PATENTS

| | | |
|---|---|---|
| 9,904 | Great Britain | of 1906 |
| 493,281 | Germany | Mar. 3, 1930 |
| 558,485 | Germany | Sept. 7, 1932 |
| 237,074 | Switzerland | Sept. 1, 1948 |
| 243,078 | Switzerland | Dec. 2, 1946 |
| 491,420 | Great Britain | Sept. 1, 1938 |